United States Patent [19]

Bahn

[11] Patent Number: 5,278,482
[45] Date of Patent: Jan. 11, 1994

[54] THREE-PHASE RELUCTANCE TYPE MOTOR

[75] Inventor: Itsuki Bahn, Tokyo, Japan

[73] Assignee: Kabushikikaisha Sekogiken, Tokyo, Japan

[21] Appl. No.: 856,915

[22] PCT Filed: Sep. 12, 1991

[86] PCT No.: PCT/JP91/01217

§ 371 Date: May 18, 1992

§ 102(e) Date: May 18, 1992

[87] PCT Pub. No.: WO92/05627

PCT Pub. Date: Apr. 2, 1992

[30] Foreign Application Priority Data

Sep. 20, 1990 [JP] Japan .................... 2-248643

[51] Int. Cl.[5] .................. H02P 7/00; H02K 19/10
[52] U.S. Cl. .................. 318/701; 318/138; 318/254; 318/696
[58] Field of Search .............. 318/138, 254, 696, 439, 318/166, 701; 310/166, 168, 170, 185, 199, 254, 264, 269, 49R

[56] References Cited

U.S. PATENT DOCUMENTS

| | | | |
|---|---|---|---|
| 3,673,476 | 6/1972 | Hamburg | 318/138 |
| 4,282,464 | 8/1981 | Uzuka | 318/138 |
| 4,670,696 | 6/1987 | Byrne et al. | 318/701 |
| 4,739,240 | 4/1988 | MacMinn et al. | 318/696 |
| 4,772,839 | 9/1988 | MacMinn et al. | 318/696 |
| 4,777,579 | 10/1988 | Jahns et al. | 363/98 |
| 4,868,478 | 9/1989 | Hedlund et al. | 318/696 |
| 4,933,621 | 6/1990 | MacMinn et al. | 318/696 |
| 5,043,643 | 8/1991 | Hedlund et al. | 318/254 |
| 5,075,610 | 12/1991 | Harris | 318/701 |

FOREIGN PATENT DOCUMENTS

2-106192 4/1990 Japan .
2-231986 9/1990 Japan .

Primary Examiner—Paul Ip
Attorney, Agent, or Firm—Staas & Halsey

[57] ABSTRACT

The present invention relates to a three-phase reluctance type motor with a large output torque which can be used as a driving source of various industrial apparatus. There are provided adjacent two magnetic poles (16a, 16a') and other adjacent two magnetic poles (16d, 16d') facing to above adjacent two magnetic poles in a diameter direction of the motor with relation to each of first to third phases. These four magnetic poles are excited by four exciting coils (17a, 17a', 17d, and 17d'), respectively. The exciting coils of each phase generates a large magnetomotive force as a whole. In such a manner, a limited installation space for the exciting coil is effectively utilized so as to increase magnetomotive force of the exciting coil, thus a large output torque is generated. Furthermore, at the moment the current supply to respective phase exciting coil (17a, 17a', 17d, and 17d') is terminated, magnetic energy stored in one phase exciting coil is transferred into other phase exciting coil (17a, 17a', 17d, and 17d'), thereby promptly extinguishing the stored magnetic energy stored in the one phase exciting coil and promptly building up an exciting current in the other phase exciting coil so that the motor can be driven in a high speed region.

8 Claims, 7 Drawing Sheets

THREE-PHASE RELUCTANCE TYPE MOTOR

TECHNICAL FIELD

The present invention relates to a reluctance type motor, particularly to a three-phase reluctance type motor capable of outputting large torque and preferable for using as driving sources for various industrial apparatus.

BACKGROUND ART

Typical three-phase reluctance type motor comprises a stator having six magnetic poles and a rotor having four or eight salient-poles. Three sets of magnetic poles, each set consisting of two magnetic poles facing each other in a diameter direction of the motor, are associated with three sets of exciting coils constituting a first to a third phase exciting coils, respectively. When exciting current is successively supplied to the first to the third exciting coils, the magnetic poles are excited to cause magnetic attraction force between the excited magnetic poles and their corresponding salient-poles. And, this magnetic attraction force causes the rotor to rotate.

Figure 1:
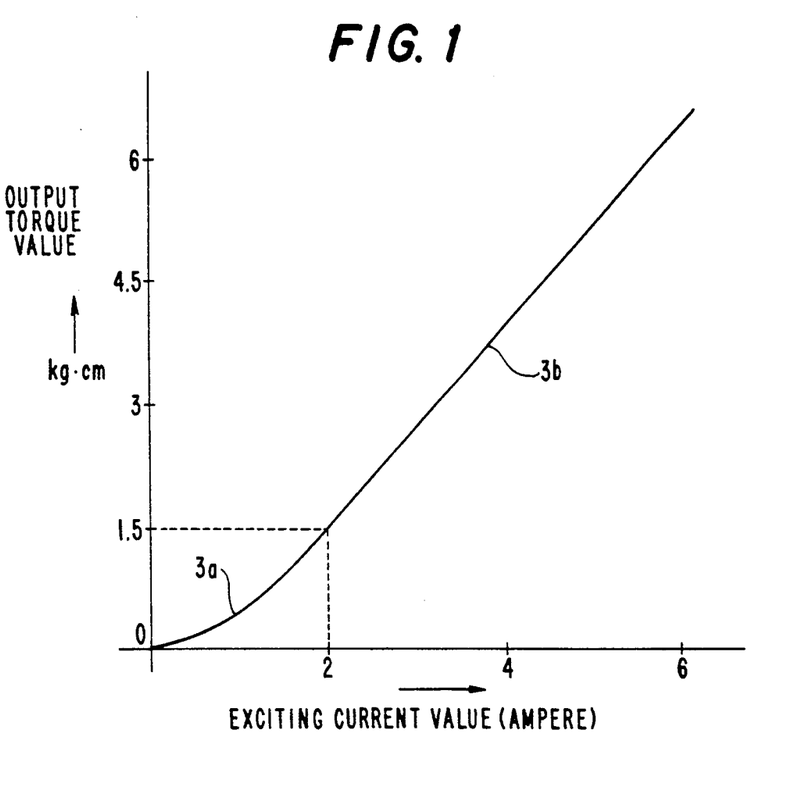
FIG. 1 is a graph exemplarily showing a curve representing a relationship between an exciting current value and an output torque value in a reluctance type motor.

In a reluctance type motor, even when a magnetic flux penetrating magnetic poles is in a saturated condition, an output torque of the motor increases in accordance with increase of a magnetomotive force (i.e. an ampere-turn) defined by a number of turns of an exciting coil multiplied by its exciting current. For example, in case of a reluctance motor of approximately 500 watt output, as shown in FIG. 1, an output torque increases in proportion to a square value of an exciting current in a region 3a in which the exciting current is smaller than, for example, 2 ampere, and to the contrary it increases in proportion to the exciting current itself in a region 3b in which the exciting current is larger than 2 ampere.

Accordingly, theoretically, the output torque of motor can be increased by increasing magnetomotive force of exciting coils. However, an available space inside of the motor which the exciting coils can occupy is limited, therefore it is difficult to scale up the exciting coil in order to increase number of turns of the exciting coil. Furthermore, an increase of the exciting current is accompanied with increase of copper loss. Thus, it is difficult to increase an output torque of the reluctance type motor by increasing magnetomotive force of the exciting coil.

Generally, in a three-phase reluctance type motor, an initiation and a termination of exciting current supply coincides with a 180-degree electric angle rotation of a rotor. That is, during one complete revolution of the rotor, an accumulation and an extinction of magnetic flux are repeated 6 times. Such a large number of repetition of the accumulation and the extinction of magnetic flux during one complete revolution of the rotor increases iron loss in the reluctance type motor. Moreover, since an inductance of the exciting coil is large, magnetic energy stored in the exciting coil becomes remarkably large. Therefore, it requires significant time for completion of accumulation and extinction of magnetic energy. For this reason, a building-up and a trailing edge of the exciting current are delayed undesirably.

Accordingly, not only torque reductions occur (i.e. the torque is reduced), but also counter torques are generated. However, since these torque reduction and counter torque generation are increased in accordance with increase of rotational speed of the motor, it is difficult to cause the motor to rotate in a high speed region.

Especially, if the number of salient-poles and magnetic poles is increased in order to increase an output torque of the motor, or a gap between the salient-pole and the magnetic pole is set to be small, a period of time required for the building-up or the trailing edge of the exciting current derived from stored magnetic energy further increases. Thus, the rotational speed remarkably decreases.

Consequently, in a conventional reluctance type motor, it was difficult to realize both a required rotational speed and a large output torque.

SUMMARY OF INVENTION

The purpose of the present invention is to provide a three-phase reluctance type motor of large output torque which can be used as driving sources for various industrial apparatus.

In order to accomplish the above purpose, a three-phase reluctance type motor of the present invention comprises: a fixed armature with three sets of magnetic poles relating to first, second, and third phases which are formed on its inner peripheral surface according to a predetermined order; three sets of exciting coils being associated with the three sets of magnetic poles and relating to the first, the second, and third phases; and a rotor which is rotatably disposed and has an outer peripheral surface formed with a predetermined number of salient-poles disposed at regular intervals, said predetermined number exceeding a total number of magnetic poles of the fixed armature.

Each set of magnetic poles consists of adjacent two magnetic poles and other adjacent two magnetic poles facing the adjacent two magnetic poles in a diameter direction of the motor. And, each set of exciting coils are connected with each other.

Furthermore, a three-phase reluctance type motor in accordance with the present invention comprises: a position detecting device for successively generating a series of position detecting signals in accordance with rotation of the rotor; a current supply control circuit being connected to a direct-current power source for successively activating three sets of exciting coils in response to the position detecting signals; and a circuit means which discharges magnetic energy stored in one set of exciting coils having been just deactivated into another set of exciting coils to be subsequently activated so that not only the stored magnetic energy can be promptly extinguished but an exciting current flowing in another set of exciting coils can be steeply increased.

As described above, in accordance with the present invention, four magnetic poles consisting of adjacent two magnetic poles and other adjacent two magnetic poles facing the above adjacent two magnetic poles in a diameter direction of the motor are provided in conjunction with each of the first, the second, and the third phases. These four magnetic poles are excited by four exciting coils associated with these magnetic poles respectively. As a result, an overall magnetomotive force of exciting coils of respective phases is largely increased compared with a conventional reluctance type motor which is provided with two exciting coils relating to each of a first, a second, and a third phases.

Namely, in accordance with the present invention, a limited installation space for exciting coils inside of the motor is effectively utilized. Accordingly, a magnetomotive force of exciting coils can be increased without scaling up the motor, and therefore the output torque of the motor can be increased.

Further, in accordance with the present invention, magnetic energy stored in one set of exciting coils having been just deactivated is discharged into another set of exciting coils to be subsequently activated, therefore not only the stored magnetic energy can be promptly extinguished but the exciting current flowing in another set of exciting coils can be steeply increased.

Consequently, a motor in accordance with the present invention can be driven at a higher rotational speed which is required as a driving source for various industrial apparatus, irrespective of the increased number of magnetic poles and salient-poles compared with conventional motors. In this manner, the present invention provides a three-phase reluctance type motor of large output torque capable of being used as a driving source suitable for various industrial apparatus.

DESCRIPTION OF THE PREFERRED EMBODIMENTS

Figure 2:
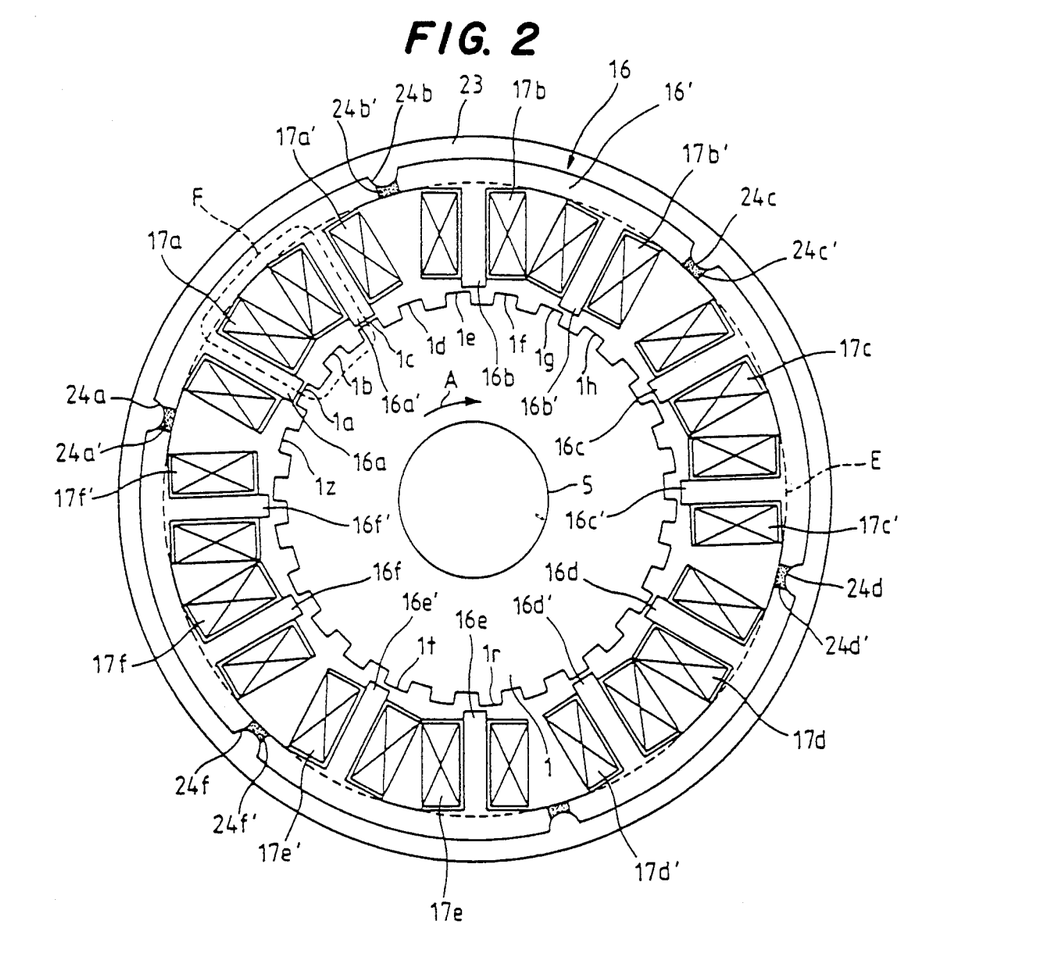
FIG. 2 is a schematic cross-sectional view showing a main body of a three-phase half-wave reluctance type motor in accordance with a first embodiment of the present invention.

A three-phase half-wave reluctance type motor in accordance with a first embodiment of the present invention comprises a motor main body shown in FIG. 2. The motor main body comprises a surrounding wall 23 of a housing, a rotor shaft 5 with its end portions being rotatably supported on bearings (not shown) provided on both end walls of the housing which are respectively fixed to the surrounding wall 23 of the housing, a rotor 1 coupled with the rotor shaft 5, and an armature (i.e. a stator) 16 disposed coaxially with the rotor 1 and fixed on the surrounding wall 23 of the casing.

The rotor 1 and the armature 16 are respectively made of a well-known lamination layer of silicon steel sheet. The housing surrounding wall 23 is buried and fixed in an outer peripheral surface of the armature formed with recessed portions 24a to 24f by an aluminum die-cast. A die-cast material constituting the surrounding wall 23 intrudes in an outer peripheral portion of the armature 16 by a depth indicated by a letter E in the drawing. Connecting portions 24a' to 24f' between the surrounding wall 23 and the armature 16 are removed by being cut after having finished the die-cast work. That is, on the armature 16, there are formed with cutouts 24a' to 24f' partitioning a magnetic path relating to one adjacent pair of magnetic poles from a magnetic path relating to other adjacent pair of magnetic poles.

On outer peripheral surface of the rotor 1, twenty six salient-poles 1a to 1z each having the same circumferential width are formed at regular intervals in a circumferential direction so as to respectively protrude in a radially outward direction. Moreover, the armature 16 has a circular magnetic core 16' freely forming a magnetic path, and twelve magnetic poles 16a to 16f and 16a' to 16f' are formed at regular intervals in a circumferential direction on an inner peripheral surface of the magnetic core so as to respectively protrude in a radially inward direction. Tip (i.e. distal) ends of the magnetic pole and its opposing salient-pole are disposed to face with each other over an air gap of an approximately 0.15 mm. The magnetic poles have respectively the same circumferential width, which is the same width as that of the salient-pole. A spaced gap of adjacent two magnetic poles, for example, magnetic poles 16a and 16a', coincides with a section wherein three salient-poles, for example, salient-poles 1a to 1c are disposed. That is, adjacent two magnetic poles are spaced with each other by a distance equal to four times of a width of salient-pole.

The adjacent two magnetic poles 16a, 16a' constitute a first set of magnetic poles together with adjacent two magnetic poles 16d, 16d' which are disposed to oppose above adjacent two magnetic poles 16a, 16a' in a diameter direction of the motor. The first set of magnetic poles relates to a first phase. The adjacent two magnetic poles 16b, 16b' constitute a second set of magnetic poles together with adjacent two magnetic poles 16e, 16e' which are disposed to oppose above adjacent two magnetic poles 16b, 16b' in a diameter direction of the motor. The second set of magnetic poles relates to a second phase. And, the adjacent two magnetic poles 16c, 16c' constitute a third set of magnetic poles together with adjacent two magnetic poles 16f, 16f' which are disposed to oppose above adjacent two magnetic poles 16c, 16c' in a diameter direction of the motor. The third set of magnetic poles relates to a third phase.

These magnetic poles 16a to 16f and 16a' to 16f' are associated with exciting coils 17a to 17f and 17a' to 17f', respectively. Since adjacent two magnetic poles are spaced with each other by a distance equal to four times of a width of salient-pole, there is provided a fairly large occupying space for the exciting coils to be coupled with the magnetic poles. Accordingly, it becomes possible to constitute each exciting coil by turning a large diameter copper wire by a required turn number so as to obtain a required magnetomotive force.

The first set of exciting coils 17a, 17a', 17d, and 17d' relating to the first phase are connected with each other in series or in parallel. Otherwise, the first set of exciting coils 17a, 17a', 17d, and 17d' are connected in such a manner that two pair of series exciting coils are connected in parallel. Hereinafter, this connected unit is referred to as a first phase exciting coil K. The second set of exciting coils 17b, 17b', 17e, and 17e' and the third set of exciting coils 17c, 17c', 17f, and 17f' are connected in the same fashion as the first set of exciting coils 17a, 17a', 17d, and 17d'. These connected units are referred to as a second phase exciting coil L and a third phase exciting coil M.

Figure 3:
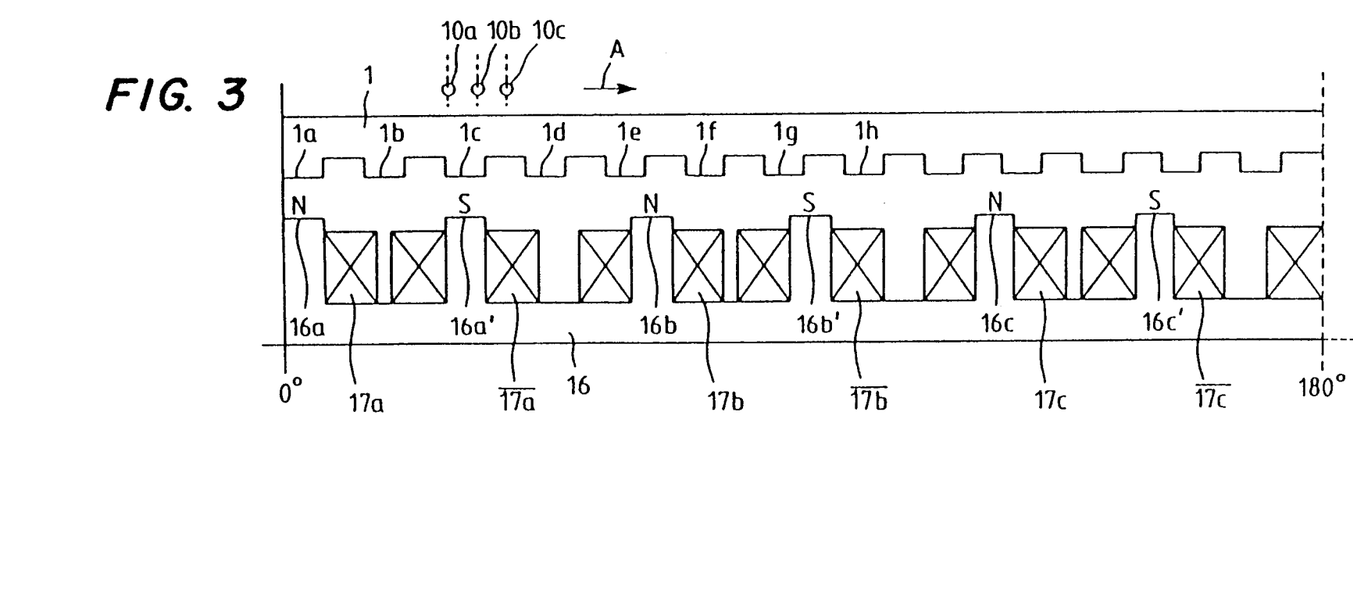
FIG. 3 is a development showing a rotor and an armature of FIG. 2 together with position detecting elements about a half peripheral portion of the motor.
Figure 4:
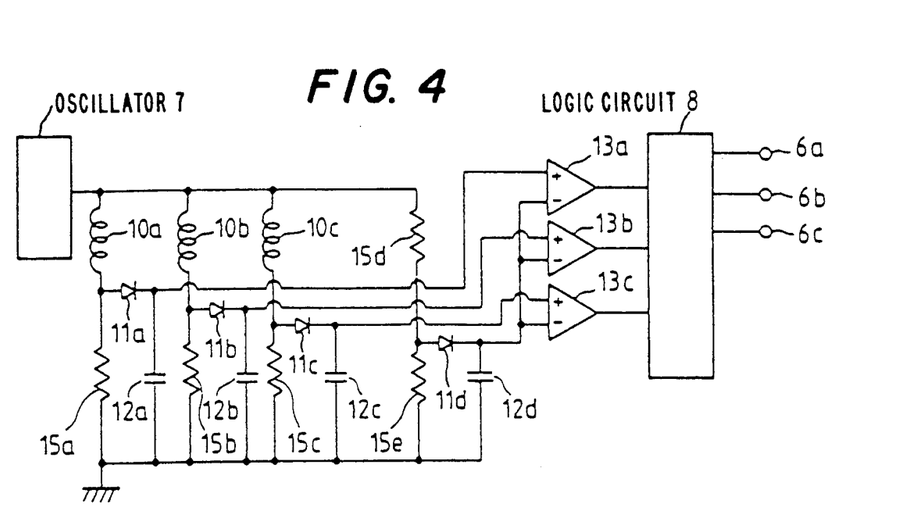
FIG. 4 is a schematic circuit diagram showing a position detecting device adopted together with a motor main body.

The motor comprises a position detecting device shown in FIG. 4. The position detecting device includes three detecting elements 10a to 10c (FIG. 3) each consisting of an air-core coil of approximately 100 turns having 5 mm diameter for detecting rotational positions of salient-poles 1a to 1z of the rotor 1. These detecting elements (hereinafter, referred to as detecting coils) are respectively spaced by 120 degrees with each other, and respective coil surface are fixed on the armature 16 so as to face the side surfaces of the salient-poles 1a to 1z with keeping air gaps. Furthermore, the position detecting device includes an oscillator 7 having an oscillation frequency of approximately 1 MHz. An output of the oscillator 7 is connected to a bridge circuit consisting of detecting coils 10a to 10c and resistance 15a to 15e.

This bridge circuit is adjusted to balance in a condition that the detecting coils 10a to 10c do not face to any of the salient-poles 1a to 1z. This bridge circuit is connected to a logic circuit 8 through low-pass filters consisting of diodes 11a to 11d and capacitors 12a to 12d and operational amplifiers 13a to 13c.

In more detail, the diode 11a has an anode connected to the connecting point of the coil 10a and the resistance 15a, and has a cathode connected to both the other end of the capacitor 12a with one end being grounded and the positive input terminal of the operational amplifier 13a. In a similar way, the diode 11b has an anode connected to the connecting point of the coil 10b and the resistance 15b and has a cathode connected to both the other end of the capacitor 12b with one end being grounded and the positive input terminal of the operational amplifier 13b. And further, the diode 11c has an anode connected to the connecting point of the coil 10c and the resistance 15c and has a cathode connected to both the other end of the capacitor 12c with one end being grounded and the positive input terminal of the operational amplifier 13c.

And, the diode 11d has an anode connected to the connecting point of resistances 15d, 15e and has a cathode connected to both the other end of the capacitor 12d with one end being grounded and negative input terminals of the operational amplifiers 13a to 13c. Output terminals of the operational amplifiers 13a to 13c are connected to input terminals of the logic circuit 8.

Figure 5:
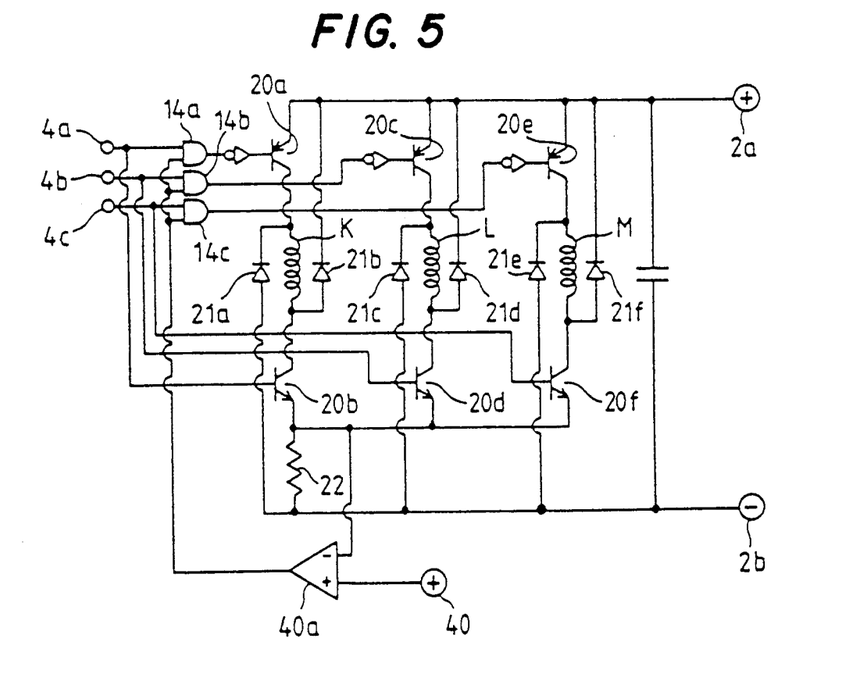
FIG. 5 is a schematic circuit diagram showing a current supply control circuit used together with the motor main body and the position detecting device.

The motor further comprises a current supply control circuit shown in FIG. 5 to allow or prevent the exciting current supply to the exciting coils 17a to 17f and 17a' to 17f'; i.e. the first to third phase exciting coils K to M.

Input terminals 4a to 4c of the current supply control circuit are connected, on one hand, to output terminals 6a to 6c of the position detecting device, and connected, on the other hand, to one side input terminals of AND circuits 14a to 14c of the current supply control circuit, respectively. And, the other side input terminals of the AND circuits 14a to 14c are connected to a standard voltage input terminal 40 to which a standard voltage is applied in order to vary an output torque of the motor, through an operational amplifier 40a constituting a later-described chopper circuit together with the AND circuits.

Further, output terminals of the AND circuits 14a to 14c are connected through inversion circuits to bases of transistors (i.e. switching elements) 20a, 20c, and 20e interposed between a positive terminal 2a of the DC power source and one end of the first to third phase exciting coils K to M. The other ends of the first to third phase exciting coils K to M are connected through transistors 20b, 20d, 20f and resistance 22 to a negative terminal 2b of the DC power source, and on the other hand, connected through transistors 20b, 20d, and 20f to a negative terminal of the operational amplifier 40a.

The resistance 22 is provided to detect an exciting current flowing in the first to third phase exciting coils K to M. One end of the resistance 22 is connected to emitters of the transistors 20b, 20d, and 20f, and the other end is connected to anodes of diodes 21a, 21c, and 21f. Cathodes of these diodes 21a, 21c, and 21f are connected to one side end of the first to third phase exciting coils K to M. And further, diodes 21b, 21d, and 21f are interposed between the other side ends of the first to third phase exciting coils K to M and the positive terminal 2a of the DC power source.

Hereinafter, an operation of three-phase half-wave reluctance type motor, constituted as above-described, will be explained in the following.

The bridge circuit of the position detecting device (FIG. 4) installed in the motor is adjusted to balance when the detecting coils 10a to 10c do not face any one of the salient-poles 1a to 1z of the rotor 1. Accordingly, when the detecting coil 10a does not face any one of the salient-poles 1a to 1z, an output of the low-pass filter consisting of the diode 11a and the capacitor 12a becomes equal to an output of the low-pass filter consisting of the diode 11d and the capacitor 12d. Therefore, an output of the operational amplifier 13a becomes a LOW-level. However, as a matter of fact, when the motor is stopped, any one of the detecting coils faces to any one of salient-poles.

Figure 7:
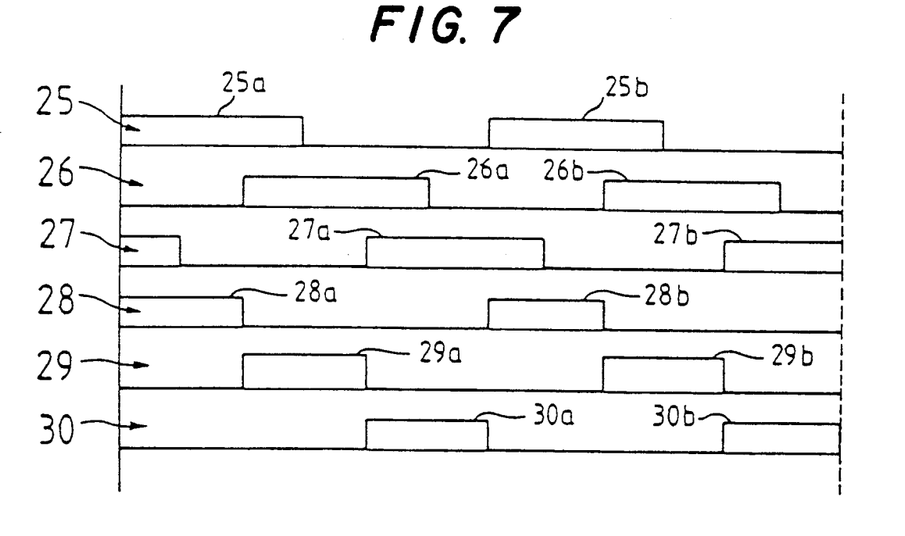
FIG. 7 is a timing chart showing changes of various signals in the position detecting device with respect to elapsed time.

Accordingly, for example in the case that the detecting coil 10a faces any one of salient-poles, impedance of the detecting coil 10a decreases due to core loss (i.e. eddy loss and hysteresis loss). Therefore, voltage drop in the resistance 15a becomes large, and an applied voltage to the positive input terminal of the operational amplifier 13a increases to turn the output 25 of the operational amplifier into a HIGH-level (as indicated by the reference numerals 25a, 25b in FIG. 7). That is, in accordance with rotation of the rotor 1, rectangular-wave signals 25 are sent out from the operational amplifier 13a.

When each of the detecting coils 10b, 10c faces to the side surface of any one of salient-poles 1a to 1z, voltage drops at the resistances 15b, 15c become large. Therefore, input voltages, applied through the low-pass filters 11b, 12b and 11c, 12c, increases to turn the output 26, 27 (FIG. 7) of the operational amplifiers 13b, 13c into a HIGH-level (as indicated by the reference numerals 26a, 26b, 27a, and 27b in FIG. 7). And, in accordance with the rotation of the rotor 1, rectangular-wave signals 26, 27 are output from both operational amplifiers. The above rectangular-wave signals 25 to 27 have a phase difference of 120 degrees with respect to each other.

The logic circuit 8 has input terminals inputting these rectangular-wave signals 25 to 27 and outputting rectangular-wave signals 28 to 30 (FIG. 7) corresponding to an AND result of mutually corresponding ones among the rectangular-wave signals 25, 26 and 27 and their inverted signals. As a result, in accordance with rotation of the motor, output terminals 6a to 6c of the position detecting device successively send out first to third position detecting signals 28 to 30 (FIG. 7) of 120-degree width which relate to the first to third exciting coils K to M and represent positions of salient-poles of the rotor 1.

When the motor is turned on, electric current is supplied from the positive and negative terminals 2a, 2b of the DC power source in the current supply circuit (FIG. 5). Furthermore, a negative input terminal of the operational amplifier 40a is applied to a voltage lower than a voltage applied to its positive input terminal. A HIGH-level signal is applied from the operational amplifier 40a to the AND circuits 14a to 14c to open the gates of these AND circuits. As is described above, when the motor is started, any one of the detecting coils 10a to 10c of the position detecting device faces any one of the salient-poles 1a to 1z of the rotor 1 of the motor.

In such a condition, for example, when the second phase position detecting signal 29a of a HIGH-level is applied from the position detecting device to an input terminal 4b of the current supply control circuit, this HIGH-level signal 29a is applied to the base of the transistor 20d. And, a HIGH-level output sent out from the AND circuit 14b, of which gate is in an opened condition, is converted into a LOW-level output through the inversion circuit and, in turn, applied to the base of the transistor 20c. Accordingly, the transistors 20c, 20d are activated to turn on the second phase exciting coil L.

As a result of these changes, magnetic poles 16b and 16b' of the armature 16 are magnetized to become an N-pole and an S-pole, respectively, and the magnetic poles 16e and 16e' of the armature 16 are magnetized to become an N-pole and an S-pole, respectively. Accordingly, the salient-poles 1e, 1g, 1r, and 1t are attracted by magnetic force to cause the rotor 1 to rotate in a direction A of FIG. 2. After that, if the rotor 1 rotates 120 degrees, the second phase position detecting signal 29 becomes a LOW-level and, at the same time, the third phase position detecting signal 30a of a HIGH-level is applied to the input terminal 4c of current supply control circuit. Namely, the second phase exciting coil L is deactivated and the third phase exciting coil M is activated.

If, the rotor 1 further rotates 120 degrees, the third phase exciting coil M is deactivated and the first phase exciting coil K is activated.

In such a manner, current supply mode is cyclically alternated at intervals of 120-degree revolutions as follows; the first exciting coil K, the second exciting coil L, the third exciting coil M. As a result, the exciting coils K to M are successively and continuously supplied exciting current to cause the motor to generate output torque.

During the current supply operation to each of the first to third phase exciting coils K to M, a magnetic path relating to each pair of two pairs of exciting coils, which are in excited condition, is closed as indicated by a broken line F in FIG. 2, since the armature 16 is formed with cutouts 24a' to 24f' having a function of partitioning a magnetic path. Therefore, during the current supply period of time to respective phase exciting coils, magnetic flux generated by the exciting coils passes only a portion of armature which contributes to generate torque and does not pass other portions. Namely, the magnetic poles of each phase have substantially the same construction as an U-shaped magnetic core. Consequently, the exciting current is effectively utilized to generate torque and also to reduce copper loss. Furthermore, since an overall volume of a magnetic member becomes minimum, an efficiency of the motor can be increased due to reduction of core loss. The core loss occurs in accordance with generation of magnetic flux or its extinction which is related to an initiation or termination of current supply to the exciting coils.

Moreover, during a current supply period of time to respective exciting coils K, L, or M, excited two pairs of magnetic poles generate a magnetic attraction force acting in a radial direction in addition to a magnetic attraction force acting in a circumferential direction. However, the radial magnetic attraction force generated by one pair of magnetic poles and the radial magnetic attraction force generated by the other pair of magnetic poles are mutually canceled, thereby preventing damage of bearings and suppressing occurrence of vibration.

During a current supply period of time to respective phase exciting coils, for example, during the first phase position, detecting signal 28a of a HIGH-level is generated to activate the first phase exciting coil K. If exciting current flowing in the exciting coil K exceeds a set value corresponding to the standard voltage, which is applied to the positive input terminal of the operational amplifier 40a through the standard voltage input terminal 40 in the current supply control circuit of FIG. 5 and is set variably, an output of the operational amplifier becomes a LOW-level and the gate of the AND circuit 14a closes so as to deactivate the transistor 20a.

In this instance, magnetic energy stored in the exciting coil K is discharged as current flowing through the diode 21a, the transistor 20b, and the resistance 22. Subsequently, when this discharge current reduces down to a predetermined value to be determined in accordance with a hysteresis characteristic of the operational amplifier 40a, the output of the operational amplifier returns to a HIGH-level so as to activate the transistor 20a again to let exciting current flow.

In this manner, the operational amplifier 40a cooperates with the AND circuit 14a to activate or deactivate the transistor 20a on the basis of comparison between the exciting current and above set value so as to control the exciting current; i.e. the output torque of the motor. The same explanation is applied to other phases. Thus, the operational amplifier 40a functions as a chopper circuit together with the AND circuits 14a to 14c.

Figure 6:
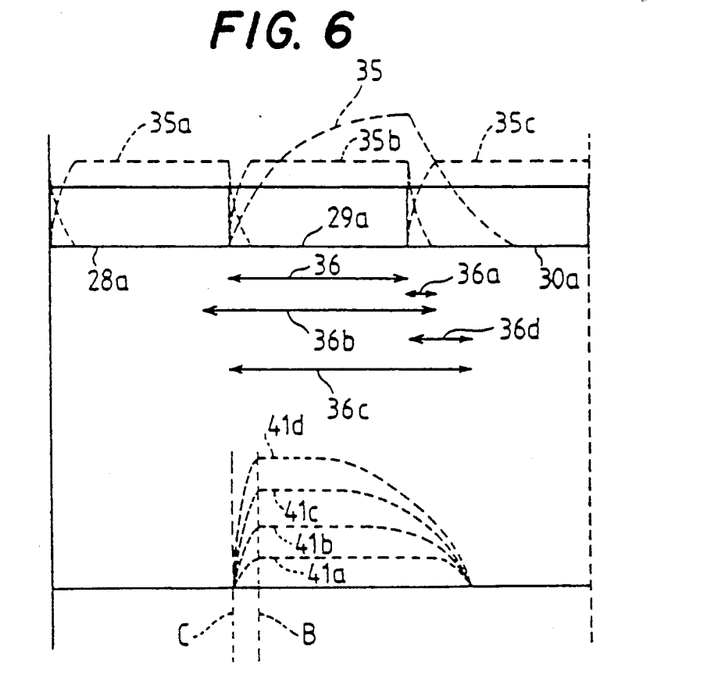
FIG. 6 is a graph showing exciting current curves and output torque curves.

Next, referring now to FIG. 6, the following is an explanation of characteristic features in the operation of the motor in accordance with the present embodiment.

In a conventional motor, for example, if the exciting current is supplied to the second phase exciting coil L during a section corresponding to a 120-degree width of the second phase position detecting signal 29a shown by an arrow 36, the exciting current causes a time lag in its building-up state as shown by a first half of a broken line curve 35 due to large inductance of the exciting coil L.

Moreover, since large magnetic energy is discharged, a trailing edge of the exciting current is extended as shown by a second half of the curve 35. Hereupon, an arrow 36b denotes a 180-degree section during which a positive torque is generated. Accordingly, the torque decreases during the first half of the curve 35 (hereinafter, referred to as a generation of torque reduction). On the other hand, a large counter torque is generated during the last half. Thus, a conventional motor has a low efficiency, and its rotational speed is low.

In accordance with the motor of the present embodiment, such a disadvantage can be removed. The reason is explained as follows. For example, when the exciting current is supplied to the second phase exciting coil L in accordance with the second position detecting signal 29a, a high voltage is applied from the DC power source 2a. Thus, the exciting current increases steeply as shown by a broken line curve 35b in FIG. 6, therefore torque reduction can be prevented from being generated. The same explanation can be applied with respect to other phase exciting coils. In the case that the motor is driven at a high speed, a width of the position detecting signal becomes short. Therefore, a DC power source having a high terminal voltage is adopted so as to shorten the width of building-up portion of the current supply curve in response to this change.

Furthermore, for example, when the first phase position detecting signal 28a is built up, the transistors 20a, 20b are both deactivated. Magnetic energy stored in the exciting coil K is discharged along a path of the diode 21b, the DC power source terminal 2a, 2b, the resistance 22 and the diode 21a. That is, magnetic energy is returned to the DC power source. As a result, the exciting current is abruptly reduced. Returned magnetic energy is generally stored in a large-capacity rectifying capacitor accommodated in the DC power source. Here, a width (shown by an arrow 36a) of a last transition portion of the current supply curve 35a becomes shorter as electric power voltage becomes higher. And, if the width of the last transition portion does not exceed 30 degrees, substantial counter torque does not occur. The same explanation is applied to other current supply curves 35b, 35c. In the case that the motor is driven in a high speed region, a width of the position detecting signal becomes short. Therefore, a DC power source having a high terminal voltage is adopted so as to shorten the width of trailing end portion of the current supply curve in response to this change.

It should be noted that, in the apparatus of the present invention, not only an allowable maximum rotational speed of the motor can be determined in accordance with a voltage value of the DC power source but an output torque of the motor can be controlled in accordance with a standard voltage value applied to the standard voltage input terminal 40. That is, the maximum rotational speed and the output torque can be controlled independently with each other.

A reluctance type motor is different from a DC motor with a magnet rotor in that, as shown in FIG. 6, an output torque is remarkably large when a salient-pole is just positioned to begin entering toward a magnetic pole but is suddenly reduced when the salient-pole begins departing from the magnetic pole. In this case, it is possible to suppress reduction of output torque by supplying the exciting current to the exciting coils during a period of time corresponding to a central portion (120 degrees) of a positive torque generation section (180 degrees) shown by an arrow 36b in FIG. 6. By this operation, an output torque of the motor becomes flat after a timing B as shown by broken curves 41a to 41c of FIG. 6. However, as the rotational speed of the motor increases, the output torque characteristics change from the curve 41a to 41c. Therefore, a width of the flat torque portion becomes narrow.

Accordingly, in order to further flatten the output torque characteristics and preferably advance the exciting current supply timing so that the exciting current supply operation starts near a building-up point of torque curve, installation positions of the detecting coils 10a to 10c are adjusted so as to gain a flat and large output torque. In the drawing, arrows 36, 36c denote a width of the HIGH-level first phase position detecting signal 29a (120 degrees) and a width of positive torque range (180 degrees), respectively. Here, if a width of a trailing end portion of the exciting current curve 35b is smaller than a width of a section shown by an arrow 36d, the counter torque does not occur. The width of the section 36b is twice as large as a width 36a of a trailing edge portion of the section 35b. Therefore, an output torque has a long flat portion, and thus, not only ripple component of the output torque can be suppressed within a low level but the motor can be driven in a high speed region. Furthermore, it is possible to further extend the flat portion of the torque curve by changing a shape of the salient-pole of the rotor which faces to the magnetic pole of the armature 16.

The above-mentioned first embodiment can be modified variously.

Figure 8:
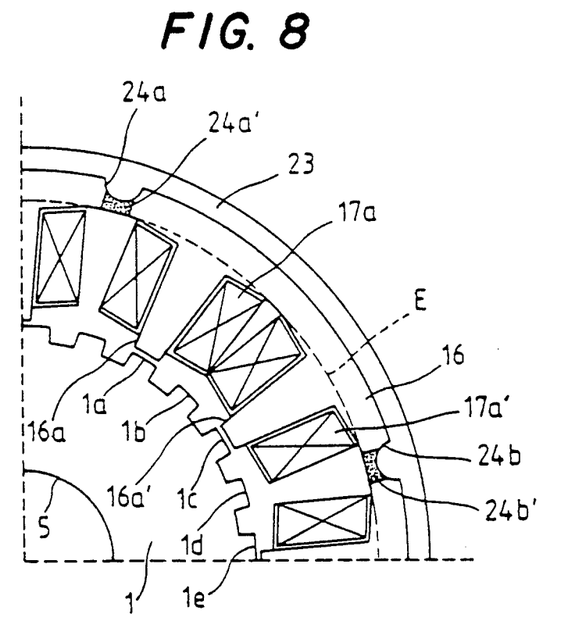
FIG. 8 is a partly shown schematic cross-sectional view of a modified embodiment of magnetic poles different from the magnetic poles of the first embodiment in its cross-sectional configuration.

For example, as shown in FIG. 8, the magnetic poles 16a to 16f and 16a' to 16f' can be formed in a trapezoidal configuration having a short edge (i.e. a tip or distal end) disposed inwardly and a long edge (i.e. a base) disposed outwardly in a radial direction. In this case, mechanical strength of the magnetic pole can be increased. Furthermore, even though the distal (or tip) end portion of the magnetic pole is magnetically saturated, the base portion of the magnetic pole is not saturated with still keeping magnetically enough room. Thus, the output torque can be increased much more.

Figure 9:
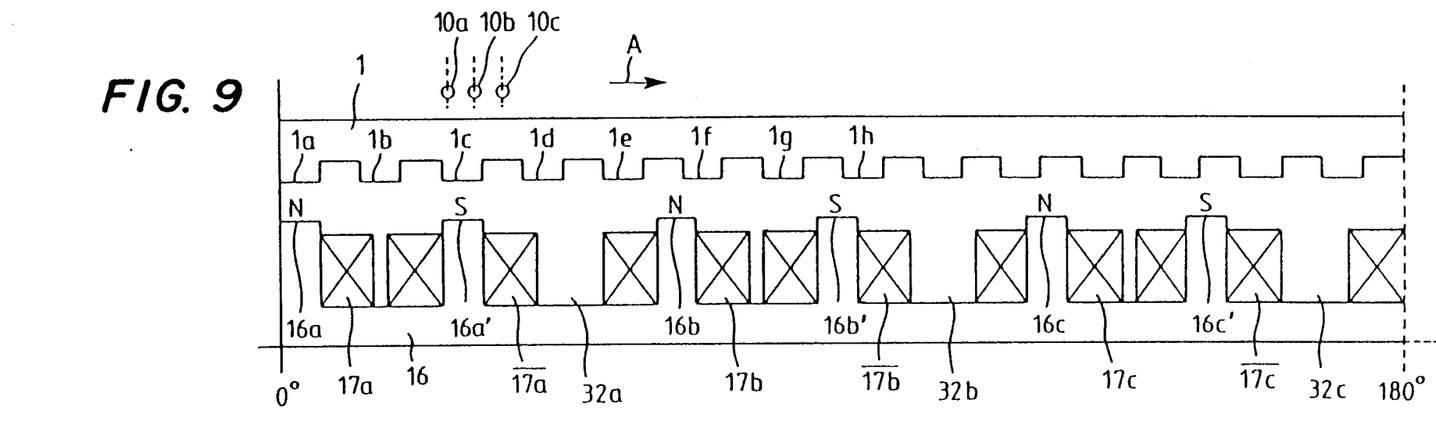
FIG. 9 is a development, which is similar to FIG. 3, showing a modified embodiment of the motor main body having a different number of salient-poles compared with that of the first embodiment.

Still further, the number of magnetic poles disposed on the rotor can be increased. A rotor 1 shown in FIG. 9 is formed with twenty eight magnetic poles (half of them are indicated in the drawing). In this manner, if the number of the magnetic poles is increased, there are formed spaces 32a, 32b, 32c, between respective paired two exciting coils. For example, between the paired exciting coils 16a, 16a' and the paired exciting coils 16b, 16b' there is formed a space 32a. This space is convenient for treatment of terminals of exciting coils and serves as a cooling air passage for cooling down the motor main body.

Moreover, as a detecting object of the detecting coils 10a to 10c, an aluminum plate with its outer peripheral portion being formed with protruding portions instead of salient-poles and synchronously rotating with the rotor 1 can be used. Otherwise, instead of a combination of the detecting coil and the rotor, it is possible to adopt a combination of a magnet rotor synchronously rotating together with the rotor 1 and a magnet resistance element which faces to this magnetic rotor.

Hereinafter, a three-phase half-wave reluctance type motor in accordance with the second embodiment of the present invention is explained.

The apparatus in accordance with the second embodiment is advantageous compared with the first embodiment in that it can be operated by a DC power source having a low terminal voltage such as a battery. Therefore, it is applicable for a power source of an electric automotive vehicle.

Figure 10:
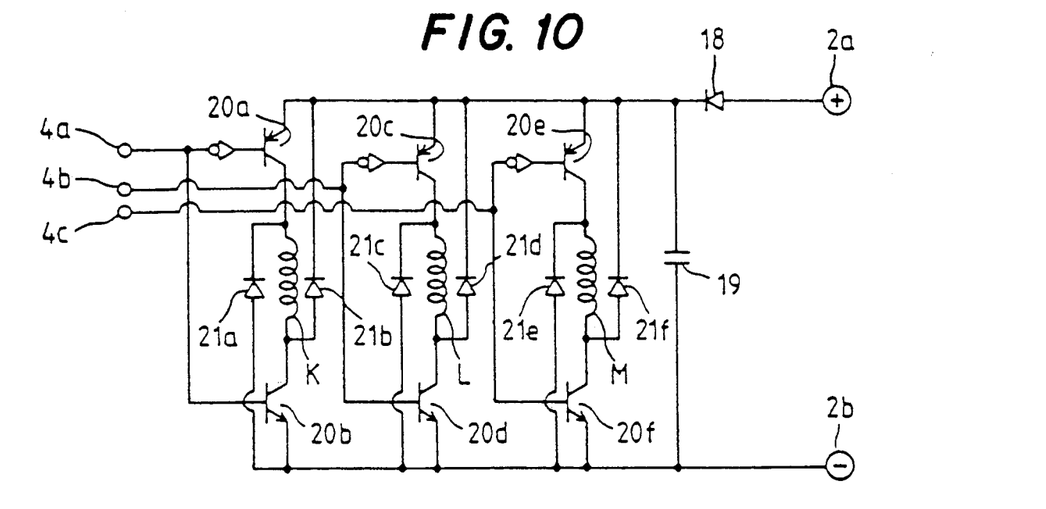
FIG. 10 is a schematic circuit diagram showing a current supply control circuit in accordance with a second embodiment of the present invention.

A reluctance type motor in accordance with the second embodiment has a current supply circuit shown in FIG. 10 instead of the current supply circuit shown in FIG. 5. This current supply control circuit includes a diode 18 preventing back flow of current and a capacitor 19 instead of the operational amplifier 40a and the AND circuits 14a to 14c.

In the same way as the first embodiment, if a HIGH-level position detecting signal such as a signal 28a, 29a, and 30a is applied from the position detecting device to the input terminals 4a to 4c of the current supply control circuit, respective phase exciting coils K to M are successively activated to rotate the motor. In this case, the exciting current takes a value obtained by dividing a difference between a voltage applied to the DC power source terminals 2a, 2b and a reverse electromotive force proportional to the output torque curves 41a to 41d of FIG. 6 by a resistance value of the exciting coil. Therefore, the exciting current becomes substantially constant at the central portion of the current supply section during which the reverse electromotive force becomes flat. To the contrary, the exciting current increases at a second half of the current supply section during which the reverse electromotive force reduces, thereby increasing an output torque so as to compensate a torque reduction shown in the second half of the output torque curve.

Then, for example, if the exciting current to the first phase exciting coil K is terminated in accordance with last transition of the HIGH-level first position detecting signal 28a, magnetic energy stored in the exciting coil K is discharged via a path consisting of the exciting coil K, the diode 21b, the capacitor 19, and the diode 21a (refer to FIG. 10). Therefore, the capacitor 19 can be charged up to a high voltage. As a result, stored magnetic energy is steeply extinguished and exciting current decreases as shown by a curve 35a (FIG. 6).

In this instance, since the second position detecting signal 29a is already applied to the input terminal of the current supply control circuit to activate the transistors 20c, and 20d, a discharged voltage of the capacitor 19 is applied to the second phase exciting coil L in addition to the DC power voltage. As a result, the exciting current flowing in the exciting coil L steeply increases as shown by the curve 35b of FIG. 6 and, subsequently, takes substantially the constant value as previously described. The same explanation can be applied to the third phase exciting coil M.

Hereupon, as a capacity of the capacitor 19 becomes smaller, respective widths of a building-up portion and a trailing end portion become narrower. Accordingly, generation of torque reduction and counter torque can be prevented even if the motor is driven in a high speed region. Thus, the motor can be driven at a high speed with high efficiency. Furthermore, it is possible to remove the capacitor 19 in the case that one of the paired transistors turn off synchronously at the timing the other paired transistors turn on, where one of the paired transistors and the other of the paired transistors are associated with exciting coils of mutually adjacent phases.

The motor in accordance with the present invention is different from the first embodiment in that not only return of stored magnetic energy to a smoothing capacitor is prevented by the diode 18 but the stored magnetic energy is successively stored in the exciting coil to be subsequently activated through the capacitor 19 so that charge and discharge of magnetic energy can be promptly accomplished between two mutually adjacent two exciting coils. Accordingly, a DC power source having a low output voltage can be used.

In the case that the motor in accordance with the present invention has an output of 500 W and the capacitor 19 has a capacity less than 0.1 fF, a time required for the charge and discharge of the magnetic energy becomes less than 20 fsec and the motor can be driven at a speed of 100,000 revolutions per minute. By the way, it is desirable to set the capacity of the capacitor to be not less than a value capable of surely preventing generation of counter torque. Furthermore, the back-flow prohibiting diode 18 may be provided to the negative terminal 2b side of the DC power source.

What is claimed is:

1. A three-phase reluctance type motor comprises:
    a fixed armature with three sets of magnetic poles corresponding to first, second, and third phases which are formed on an inner peripheral surface of said fixed armature according to a predetermined order, each set of magnetic poles including four magnetic poles comprised of a first pair of two adjacent magnetic poles and a second pair of two adjacent magnetic poles opposing said first pair of two adjacent magnetic poles in a diameter direction of the motor, said fixed armature having a ring-shaped core formed with cutouts partitioning a magnetic path relating to said first pair of two adjacent pairs of magnetic poles from a magnetic path relating to said second pair of two adjacent magnetic poles;
    three sets of exciting coils being associated with said three sets of magnetic poles and relating to the first, second, and third phases, said three sets of exciting coils being connected with each other;
    a rotor rotatably disposed and having an outer peripheral surface formed with 26-28 salient-poles disposed at regular intervals, said predetermined number exceeding a total number of magnetic poles of said fixed armature, said first and second pairs of two adjacent magnetic poles being spaced from each other by a distance approximately equal to four times a width of said salient poles;
    a position detecting device successively generating a series of position detecting signals in accordance with the rotation of said rotor;
    a current supply control circuit connected to a direct-current power source for successively activating said three sets of exciting coils in response to the position detecting signals, said current supply control circuit includes switching elements connected to both ends of said three sets of exciting coils relating to the first, second and third phases, respectively; and
    circuit means for discharging magnetic energy stored in one set of exciting coils having been just deactivated into another set of exciting coils to be subsequently activated so that the stored magnetic energy can be promptly extinguished and the exciting current flowing in said another set of exciting coils can be greatly increased, said circuit means including a diode inversely connected to a connecting unit of any one set of three exciting coils relating to the first, second and third phases and a corresponding one of said switching elements, said stored magnetic energy being discharged through said inversely connected diode into said another set of exciting coils.

2. A three-phase reluctance type motor in accordance with claim 1 in which said set of adjacent two magnetic poles are disposed to be spaced over a distance equal to a section wherein three salient-poles are arrayed.

3. A three-phase reluctance type motor in accordance with claim 1 in which each of said magnetic poles has the same circumferential width and each of said salient-poles has the same circumferential width.

4. A three-phase reluctance type motor in accordance with claim 3 in which said circumferential width of the magnetic pole is identical with said circumferential width of the salient-pole.

5. A three-phase reluctance type motor in accordance with claim 1 in which said magnetic poles are respectively formed in a trapezoidal configuration to have a base portion wider than a distal end portion in a circumferential direction.

6. A three-phase reluctance type motor in accordance with claim 1 in which magnetic poles relating to said second phase are formed spaced by a mechanical angle of 60 degrees from a respectively corresponding one of said magnetic poles relating to said first phase, and said magnetic poles relating to said third phase are formed to be spaced by a mechanical angle of 60 degrees from respectively corresponding ones of said magnetic poles relating to said second phase.

7. A three-phase reluctance type motor in accordance with claim 1 in which said position detecting device successively generates the position detecting signals continuously without overlapping with each other, and each position detecting signal has a width of an electrical angle of 120 degrees.

8. A three-phase reluctance type motor in accordance with claim 1, further comprising a back-flow prohibiting diode interposed in a direction of easy flow with respect to said direct-current power source, when one of successively generated position detecting signals is extinguished and another one of the position detecting signals is newly generated, magnetic energy stored in an exciting coil relating to said one position detecting signal can be prevented from returning to the direct-current power source by said back-flow prohibiting diode, and further said magnetic energy can be promptly transferred into magnetic energy stored in an exciting coil relating to another position detecting signal, thereby minimizing torque reduction and counter torque generation.

* * * * *